(12) United States Patent
Farid et al.

(10) Patent No.: US 7,052,059 B2
(45) Date of Patent: May 30, 2006

(54) FRUIT SKEWER

(75) Inventors: Tariq Farid, Hamden, CT (US); Kamran Farid, Hamden, CT (US)

(73) Assignee: Edible Arrangements, LLC, Hamden, CT (US)

( * ) Notice: Subject to any disclaimer, the term of this patent is extended or adjusted under 35 U.S.C. 154(b) by 9 days.

(21) Appl. No.: 10/915,191

(22) Filed: Aug. 10, 2004

(65) Prior Publication Data

US 2006/0033348 A1    Feb. 16, 2006

(51) Int. Cl.
*A47J 43/28*   (2006.01)

(52) U.S. Cl. .......................... 294/61; 294/5; 99/421 A

(58) Field of Classification Search ............... 294/1.1, 294/5, 5.5, 61; 99/419, 421 A; D7/683, D7/684; 411/452
See application file for complete search history.

(56) References Cited

U.S. PATENT DOCUMENTS

| | | | | |
|---|---|---|---|---|
| 623,571 A | * | 4/1899 | Shipe | 99/419 |
| 886,510 A | * | 5/1908 | Huguet | 294/5 |
| 895,080 A | * | 8/1908 | Eisenreich | 411/452 |
| D39,815 S | * | 2/1909 | Bomeisler | D7/684 |
| 1,360,344 A | * | 11/1920 | Wood et al. | 411/452 |
| 2,251,587 A | * | 8/1941 | Gagner | 30/303 |
| 2,275,536 A | * | 3/1942 | Maisto | 294/5 |
| D208,569 S | * | 9/1967 | Novak | D7/683 |
| 4,141,578 A | * | 2/1979 | Zinder | 294/61 |
| D268,723 S | * | 4/1983 | Wolff | D7/683 |
| 4,973,211 A | * | 11/1990 | Potucek | 411/452 |
| 5,088,782 A | * | 2/1992 | Scott | 294/5 |
| 5,193,443 A | * | 3/1993 | Carney | 99/419 |
| 5,495,794 A | * | 3/1996 | Ulysse | 99/419 |
| 5,566,997 A | * | 10/1996 | Lin | 294/5 |
| 5,779,294 A | * | 7/1998 | Magri | 294/61 |

* cited by examiner

Primary Examiner—Dean J. Kramer
(74) Attorney, Agent, or Firm—Grimes & Battersby, LLP

(57) ABSTRACT

A fruit skewer having an elongated central shaft for receiving and securing fruit, food or non-food items thereon for display or cooking. The portion of the shaft upon which the fruit or other item is to be situated has a cross-sectional area designed to prevent the object through which the skewer is inserted from rotating about the longitudinal axis of the skewer. In the preferred embodiment, the cross-sectional area is in a cross ("+") shape, although other shapes are anticipated, including a "Y" shape as well as a star shape having five or more fins (e.g., "*"). In this embodiment, the end of the skewer is tapered or beveled to allow for the easy insertion of the skewer into the fruit or other object, and the fins are chamfered. At least one projection is provided along the length of the skewer, the projection being provided so as to prevent the item through which the skewer is being inserted from sliding too far down the length of the skewer. A second projection may also be provided along the portion of the skewer on which the fruit or other item is not intended to be situated, this portion serving as the handle for the skewer. This second projection serves to prevent the entire skewer from being inserted too far into a display holder. The end of the skewer along the handle portion is also beveled or tapered so as to allow for the easy insertion of the skewer into the display holder. Multiple projections of varying heights may also be provided along the length of the skewer to allow for the insertion and retention of multiple pieces of fruit.

12 Claims, 2 Drawing Sheets

FRUIT SKEWER

BACKGROUND OF THE INVENTION

1. Field of the Invention

The present invention relates generally to the field of food preparation and display, and more particularly to the use of skewers to secure whole or sections of fruits and other food and non-food items for an ornamental display or for cooking, and even more particularly to a skewer for preventing the fruit, food or non-food items from rotating about the axis of the skewer or sliding along the length of the skewer such that the food or non-food item can be held securely in place for extended periods of time so as to allow for the creation of ornamental displays using fruit or other items, or alternatively for cooking the fruit or food items.

2. Description of the Prior Art

The use of skewers to pierce and hold fruit and food for cooking or display purposes has long been known. Such skewers may be formed from a variety of materials, both natural, such as bamboo or wood, or man-made, such as plastic or metal. The wooden and metal skewers are used for cooking as well as for display purposes, while the plastic skewers are typically used solely for display purposes, since the plastic can melt when placed in a hot cooking environment, such as a grill or an oven.

The use of specially designed skewers to prevent movement of the items placed thereon has long been known. For example, as early as 1899, skewers having a tapered body with outwardly extending elements that extend the length of the skewer for preventing rotation of the food have been known, as illustrated in U.S. Pat. No. 623,571 for a "Meat Skewer," which issued to Shipe on Apr. 25, 1899. Similarly, U.S. Pat. No. 2,622,268, which issued to Glantzlin on Dec. 23, 1952 for "Wooden Holder or Skewer" claims a flat wooden skewer having tapered edges wherein the fibers of the wood form barb-like elements adapted to engage the article into which the skewer is inserted. In yet another example, a skewer having a squared cross-section having wedge-like projections arranged in a saw-tooth pattern to prevent the food item from sliding off is shown in U.S. Pat. No. 4,141,578, which issued to Zinder on Feb. 27, 1979 for "Holder Stick for a Confectionary Product."

In some cases, end caps or other devices are used for preventing the food item from sliding off the skewer. For example, U.S. Pat. No. 2,488,362, which issued to H. Wiur on Nov. 15, 1949 for a "Grating Holder for Potatoes, Fruits, and the Like," discloses a skewer that is polygonal in cross section to prevent rotation of the food and having a removable handle. Similarly, U.S. Pat. No. 5,193,443, which issued to Carney on Mar. 16, 1993 for "Skewer for Barbecuing" discloses a skewer device having a square cross-sectional shape and a pair of slidable support members for elevating the food above the cooking surface. Such slidable elements could also be used to facilitate the removal of the food item, as is disclosed in U.S. Pat. No. 6,286,418, which issued to Berke et al. on Sep. 11, 2001 for "Barbecue Skewer Structure and Method" which teaches a rod-shaped barbecue skewer having a slidable remover that may be used to remove food from the skewer easily.

Other means for retaining the food item on the skewer have also been tried. For example, U.S. Pat. No. 2,557,890, which issued on Jun. 19, 1951 to Perry for "Skewer for Holding Rolled Roast," discloses the use of prongs or pins disposed on a rounded skewer for preventing the rotation of the food item.

Skewers having different cross-sectional shapes are also shown in design patents, including U.S. Pat. No. D208,569, which issued to Novak on Sep. 12, 1967 for "Skewer for Roasting Meat" and U.S. Pat. No. D189,441, which issued to Bonnell on Dec. 13, 1960 for "Meat Skewer."

However, there are currently no skewers offer the unique advantages of the present invention, namely a skewer having a unique cross-sectional shape designed to prevent even the most fragile of food items from rotating about the longitudinal axis of the skewer and including one or more protrusions of various heights designed to prevent the food item from sliding along the length of the skewer and to prevent the skewer from being inserted too far into the object.

SUMMARY OF THE INVENTION

Against the foregoing background, it is a primary object of the present invention to provide a fruit skewer adapted to securely receive fruit, food or non-food items and prevent movement thereof for display purposes.

It is another object of the present invention to provide such a fruit skewer that may be inserted into fruit or other foods and secure such items thereon for cooking.

It is yet another object of the present invention to provide such a fruit skewer having a cross-sectional shape designed to prevent items into which the skewer is inserted from rotating about the longitudinal axis of the skewer.

It is another object of the present invention to provide such a fruit skewer that includes one or more projections along the length of the skewer to prevent said items from sliding along the length of the skewer.

It is yet another object of the present invention to provide such a fruit skewer in which the projections are further designed to prevent the skewer from being inserted too far into an object.

It is but another object of the present invention to provide such a fruit skewer in which the projections are of various lengths to allow for the passage of certain items while preventing the passage of others.

It is still another object of the present invention to provide such a fruit skewer that may be manufactured out of plastic.

It is yet another object of the present invention to provide such a fruit skewer that is inexpensive to manufacture It is but another object of the present invention to provide such a fruit skewer that is easy to use with a variety of food and non-food items.

To the accomplishments of the foregoing objects and advantages, the present invention, in brief summary, comprises a fruit skewer of the type having an elongated central shaft, said skewer being designed to receive and secure fruit, food or non-food items thereon for display or cooking. The portion of said shaft upon which the fruit or other item is to be situated has a cross-sectional area designed to prevent the object through which the skewer is inserted from rotating about the longitudinal axis of the skewer. In the preferred embodiment, said cross-sectional area is in a cross ("+") shape, although other shapes are anticipated, including a "Y" shape as well as a star shape having five or more fins (e.g., "*"). In this embodiment, the end of the skewer is tapered or beveled to allow for the easy insertion of the skewer into the fruit or other object, and said fins are chamfered. At least one projection is provided along the length of the skewer, said projection being provided so as to prevent the item through which the skewer is being inserted from sliding too far down the length of the skewer. A second projection may also be provided along the portion of the skewer on which the fruit or other item is not intended to be situated, said portion serving as the handle for the skewer. This second projection serves to prevent the entire skewer from being inserted too far into a display holder. The end of the skewer along the handle portion is also beveled or tapered so as to allow for the easy insertion of the skewer into the display holder. Multiple projections of varying heights may also be provided along the length of the skewer to allow for the insertion and retention of multiple pieces of fruit.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

BRIEF DESCRIPTION OF THE PREFERRED EMBODIMENTS

Figure 1:
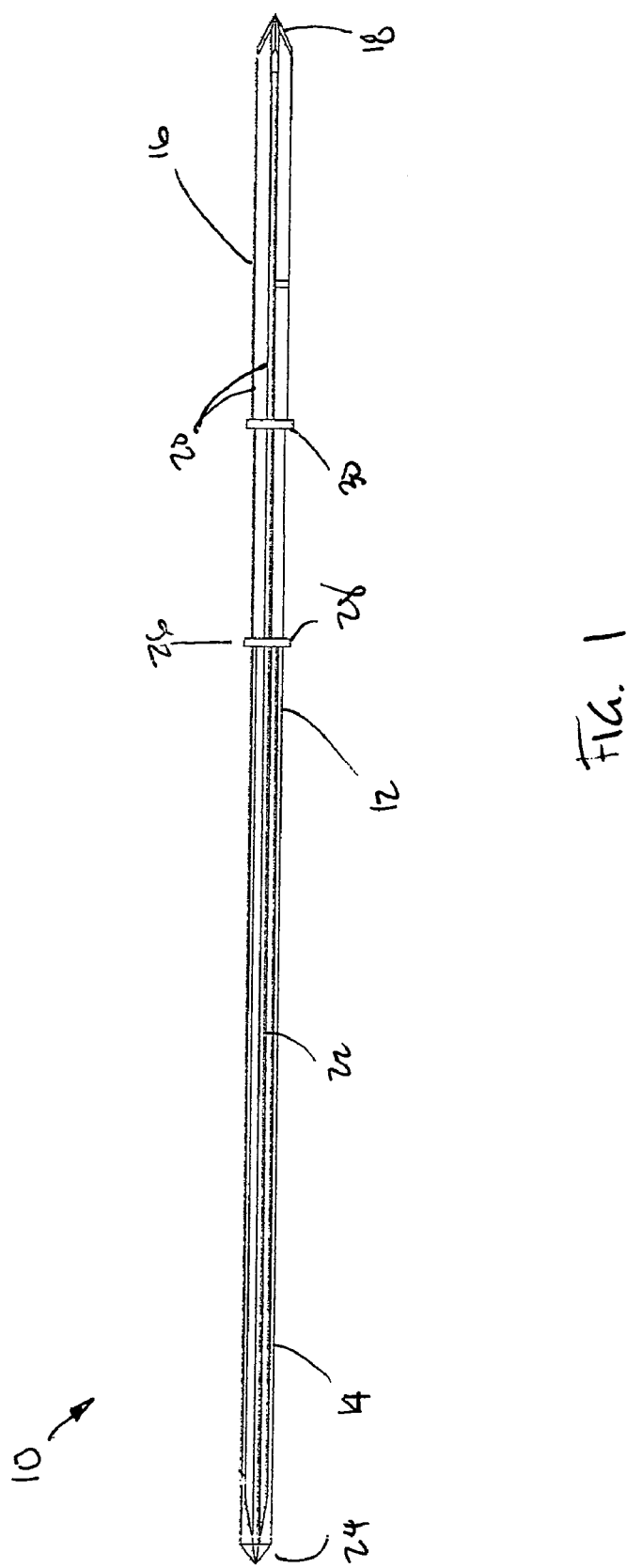
FIG. 1 is a top plan view of the fruit skewer of the present invention.
Figure 2:
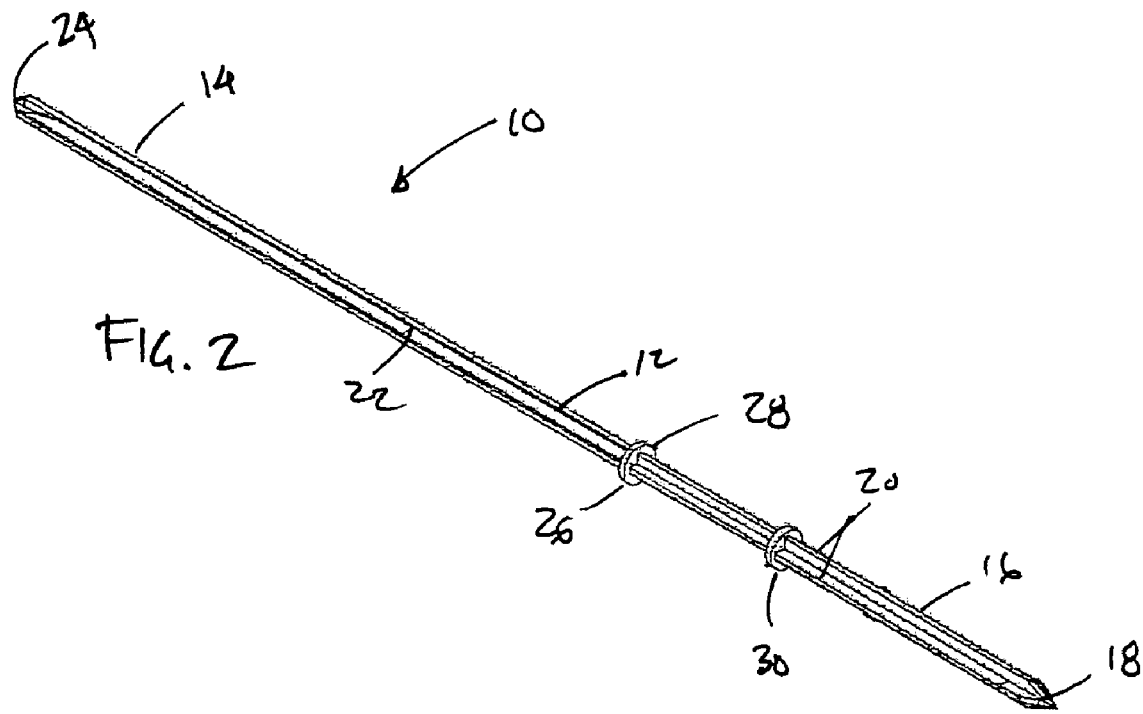
FIG. 2 is a front perspective view of the fruit skewer of FIG. 1.

Referring to the drawings and, in particular, to FIGS. 1 and 2 thereof, the fruit skewer of the present invention, referred to generally by reference numeral 10, is illustrated. The fruit skewer 10 comprises an elongated skewer rod 12 for piercing and skewering fruit, food or non-food items. The skewer rod 12 body is formed in two sections: a handle portion 14 and a skewer portion 16, the latter section being specifically designed to be inserted into a food or non-food item. In order to facilitate the insertion of the skewer portion 16 into the food or non-food item, a beveled tip 18 is provided at the end of the skewer portion 16, said beveled tip 18 having a sharp point for piercing the flesh or skin of a piece of fruit or other object. In the preferred embodiment, the angle formed by the beveled tip 18 is between 45 and 75 degrees, although it should be appreciated that any angle sufficient to create a piercing element would be adequate.

Figure 5:
FIG. 5 is a right side view of another alternative embodiment of the fruit skewer of FIG. 1.
Figure 4:
FIG. 4 is a right side view of an alternative embodiment of the fruit skewer of FIG. 1.
Figure 3:
FIG. 3 is a right side view of the fruit skewer of FIG. 1.

As illustrated in FIG. 3, the cross-sectional shape of the skewer portion 16 is in a cross-shaped ("+") configuration, wherein four longitudinal fins 20 arranged perpendicularly to each other in a cross pattern run the length of the skewer portion 16. These fins 20 are specifically adapted to engage the body of the object through which the skewer 10 is inserted to thereby prevent said object from rotating about the axis of the fruit skewer 10. Such configuration is far preferable to the traditional rounded or squared skewer cross-sectional shape inasmuch as the fins 20 are far better suited to engage the object, in much the same way as a Philips' head screwdriver engages the corresponding element on a Philips' head screw. Alternatively, different cross-sectional shapes may be utilized, as illustrated in FIG. 4, which shows the fins 20 being arranged in a "Y" shape, and in FIG. 5, which shows the fins 20 being arranged in a star shape.

In the preferred embodiment, the handle portion 14, which is designed to allow a user to grip and manipulate the fruit skewer 10 of the present invention, also includes elements designed to allow the user to maintain a firm and secure grip on the handle portion 14. In such embodiment, the handle portion 14 includes a plurality of chamfered elements 22 formed as part of the handle portion 14 and running longitudinally along the surface thereof. Said chamfered elements 22 may mirror the longitudinal fins 20 of the skewer portion, although they do not need to be as pronounced. Ideally the chamfered elements 22 are also configured in a cross-shaped pattern, which shape prevents the fruit skewer 10 from spinning in a user's hand while the skewer 10 is being manipulated, such as when a piece of fruit is being skewered.

Inasmuch as the fruit skewer 10 may be used to create a decorative display of fruit or other items, it may be desired to arrange one or more skewers 10 on a platform or display base. Accordingly, a separate tapered tip 24 may be provided at the end of the handle portion 14, which tapered tip 24 is designed to facilitate the insertion of the entire fruit skewer 10, with or without a fruit or other object attached to the skewer portion 16, into a platform or display base. The platform or display base may be as simple as a half melon. In such embodiment, the chamfered elements 22 also serve to stabilize the fruit skewer 10 and prevent it from rotating.

The handle portion 14 and the skewer portion 16 of the fruit skewer 10 are separated by a raised protrusion 26, which in the preferred embodiment takes the form of a raised annular shoulder 28. The purpose of this annular shoulder 28 is to separate the handle portion 14 and skewer portion 16, and to prevent an object skewered by the skewered portion 16 from sliding down the entire length of the skewer rod 12. The raised shoulder 28 also serves to prevent the fruit skewer 10 from being inserted too far into the platform or display base. In the preferred embodiment, a second raised annular shoulder 30 is provided between the annular shoulder 28 and the beveled tip 18, which second shoulder 30 also serves to prevent the fruit from sliding too far down the skewer rod 12, while maintaining a distance between the fruit and the platform or display base. Alternatively, this second shoulder 30 may be situated between the shoulder 28 and the tapered tip 24, along the length of the handle portion 14.

The distance between the second shoulder 30 and the beveled tip 18 may be varied so as to accommodate different fruits or other objects. For example, smaller grapes require only a small amount of the skewer portion 16 to be inserted therein, while larger strawberries require larger lengths of the skewer portion 16. Similarly, the lengths of the handle portion 14 and the skewer portion 16 may be varied depending upon the size of the fruit or objects used, or the design to be created. In the preferred embodiment, the total length of the skewer rod 12 is between 8 and 8½ inches, the distance between the annular shoulder and the beveled tip is between 2 and 2½ inches, and the distance between the annular shoulder 28 and the second shoulder 30 is between ¾ and 1½ inches. In the preferred embodiment, the widths of the annular shoulder 28 and second shoulder 30 are both between 0.04 and 0.05 inches and they both extend beyond the outer surface of the fins 20 and chamfered elements 22 by at least 0.05 inches. The overall diameter of the skewer rod 12 in the preferred embodiment is ideally between 0.2 and 0.3 inches.

It should be appreciated that, given the unique shape of the fruit skewer 10 of the present invention, certain materials are more suited for the manufacturer thereof than others. In the preferred embodiment, the skewer 10 is made of plastic, which may easily be formed to include the unique elements of the present invention. Unfortunately, since many plastics would melt if the skewer 10 were used for cooking in an extremely hot environment, such as on a grill, barbecue or in an oven, plastic is not always an ideal choice. Other suitable materials include metal, bamboo or wood.

For the ease of manufacturing, the fruit skewer 10 of the present invention is configured as a straight elongated skewer rod 12, other shapes are anticipated. It should be appreciated that one of the primary uses of the fruit skewer 10 is as a decorative element. Accordingly, the skewer 10 may be made in fanciful shapes such as curves or curlicues, or may include one or more angles. In fact, since multiple fruit skewers 10 may be utilized to create a "bouquet" of flowers made out of fruit, such as melons, grapes, strawberries and pineapples, the skewer may be configured so as to resemble the stem of a flower.

Having thus described the invention with particular reference to the preferred forms thereof, it will be obvious that various changes and modifications can be made therein without departing from the spirit and scope of the present invention as defined by the appended claims.

We claim:

1. A skewer for receiving, securing and displaying fruit, food or non-food objects, said skewer comprising an elongated rod having a handle portion and a skewer portion, said handle portion and said skewer portion being separated by a raised protrusion, wherein said skewer portion comprises a plurality of raised longitudinal fins running the length of said skewer portion, said fins being of sufficient size to engage said fruit and prevent said fruit from rotating about the axis of said skewer portion, wherein said skewer further includes means for attachment of said skewer to a platform or base by said handle portion, said skewer further including a second raised annular shoulder for preventing said skewer from being inserted completely into said platform or base, wherein said handle portion terminates in a tapered tip for facilitating the insertion of said handle portion into said platform or base.

2. The skewer of claim 1, wherein said raised protrusion comprises a raised annular shoulder, said raised annular shoulder serving to prevent said fruit from sliding down the length of said skewer.

3. The skewer of claim 2, wherein said handle portion further includes at least one chamfered element running the length of said handle portion, said chamfered element being designed to prevent the rotation of said skewer within said platform or base.

4. The skewer of claim 1, wherein said handle portion further includes at least one chamfered element running the length of said handle portion, said chamfered element being designed to facilitate the handling and manipulation of said skewer.

5. The skewer of claim 1, wherein said skewer portion terminates in a beveled tip for facilitating the insertion of said skewer portion into said fruit, food or non-food item.

6. The skewer of claim 1, wherein said skewer is manufactured from plastic.

7. The skewer of claim 1, wherein said longitudinal fins are configured in a cross-shaped cross-sectional pattern.

8. The skewer of claim 1, wherein said longitudinal fins are configured in a Y-shaped cross-sectional pattern.

9. The skewer of claim 1, wherein said longitudinal fins are configured in a star-shaped cross-sectional pattern.

10. A skewer for receiving, securing and displaying fruit, food or non-food objects, said skewer comprising an elongated rod having a handle portion and a skewer portion, said handle portion and said skewer portion being separated by a raised annular shoulder, said raised annular shoulder serving to prevent said fruit from sliding down the length of said skewer, wherein said skewer portion comprises a plurality of raised longitudinal fins running the length of said skewer portion, said fins being arranged in a cross-shaped cross-sectional pattern and being of sufficient size to engage said fruit and prevent said fruit from rotating about the axis of said skewer portion, said handle portion including at least one chamfered element and including means for attachment of said skewer to a platform or base by said handle portion and a second raised annular shoulder for preventing said skewer from being inserted completely into said platform or base, wherein said handle portion terminates in a tapered tip for facilitating the insertion of said handle portion into said platform or base.

11. The skewer of claim 10, wherein said skewer portion terminates in a beveled tip for facilitating the insertion of said skewer portion into said fruit, food or non-food item.

12. The skewer of claim 10, wherein said skewer is manufactured from plastic.

* * * * *